United States Patent
Baker et al.

[15] 3,691,643
[45] Sept. 19, 1972

[54] GYROMAGNETIC COMPASS SYSTEM

[72] Inventors: Donald H. Baker; David R. Brickner; Kenzel P. Manning, all of Phoenix, Ariz.

[73] Assignee: Sperry Rand Corporation

[22] Filed: Dec. 18, 1969

[21] Appl. No.: 886,164

[52] U.S. Cl. .................33/222, 33/204, 235/150.25
[51] Int. Cl. .............................................G01c 17/02
[58] Field of Search........33/222 CD, 222 C, 204 FA; 318/647, 648, 638

[56] References Cited

UNITED STATES PATENTS

| 2,647,233 | 7/1953 | Kutzler | 33/222 CD |
| 2,741,855 | 4/1956 | McKinley et al. | 33/222 CD |

FOREIGN PATENTS OR APPLICATIONS

| 900,933 | 7/1962 | Great Britain | 33/222 CD |

*Primary Examiner*—Robert B. Hull
*Attorney*—S. C. Yeaton

[57] ABSTRACT

A gyromagnetic compass system for navigable craft which utilizes solid state electronic circuits to provide a heading output including only the desired long term components of magnetic heading and short term components of inertial heading; a differential device having one part fixed relative to the gyro and another part positioned by the gyro is provided whereby the output of the differential normally includes both short and long term components of inertial heading; the differential output is compared with the magnetic heading components and the resulting difference output signal is integrated and applied to the fixed part of the differential device, whereby the output of the differential device includes only the long term components of magnetic heading and the short term components of inertial heading. The improvement herein disclosed greatly increases the reliability and maintainability of such a system by eliminating all electromechanical devices and by processing all the involved data in wholly solid state electronic computation circuits. One embodiment employs a digital computer for performing the computation function.

8 Claims, 7 Drawing Figures

INVENTORS
DONALD H. BAKER
DAVID R. BRICKNER
KENZEL P. MANNING

BY

ATTORNEY

GYROMAGNETIC COMPASS SYSTEM

CROSS REFERENCE TO RELATED APPLICATIONS

The present invention embodies the teachings of the following copending applications and patents, all assigned to the same assignee as the present invention: U.S. Pat. No. 3,573,610 dated Apr. 6, 1971 in the name of D. Kesselring entitled Earth's Field Sensitive Magnetometer, Ser. No. 787,143 filed Dec. 26, 1968 in the names of D. Baker et al. entitled Compass Systems and Components therefor having Automatic Field Cancellation; U.S. Pat. No. 3,576,986 dated May 4, 1971 in the names of D. Brickner et al. entitled Analog Digital Differential Apparatus; Ser. No. 880,037, filed Nov. 26, 1969 in the name of D. Brickner entitled Electronic Multipoint Compensator, Ser. No. 10,537, filed Feb. 11, 1970 in the name of C. Reed entitled Gyroscopic Stable Reference Apparatus; and Ser. No. 31,544, filed Apr. 24, 1970 in the name of Kallio entitled Sum or Difference Angle Computation Apparatus.

BACKGROUND OF THE INVENTION

FIELD OF THE INVENTION

The invention relates to gyromagnetic compass systems of the type wherein magnetic information, as supplied by a (usually) remote pendulous magnetic sensor for detecting the direction of the horizontal component of the earth's magnetic field, is used to slave the reference direction of a directional gyroscope to the said direction of the magnetic field.

Systems of this general type general type have been known to the art for many years and indeed have become the standard heading reference for modern commercial and military aircraft. The basic form of such a system is shown in such U.S. Pat. Nos. as 2,357,319; 2,383,461; 3,106,025, or 2,969,208 all assigned to present applicants' assignee. In these patents, the directional reference of the gyroscope is electromechanically slaved to the magnetic sensor direction (as detected by a flux valve of the type shown in U.S. Pat. No. 2,383,461) by comparing the direction of al., earth's field with the gyro reference direction and applying the difference therebetween to a torquer on the gyro to precess the gyro in a direction to reduce al., error Analog/Digital The flux valve senses the horizontal component of the earth's magnetic field by maintaining the sensing elements of the valve in a generally horizontal plane through a pendulous mounting thereof in the aircraft. Therefore, if the craft is subjected to acceleration forces, the flux valve information may be in error. However, in straight and level, unaccelerated flight, the valve provides good stable information. On the other hand, the gyroscope provides good stable information during turns and short term accelerations of the craft but is subject to the long term drift inherent in gyroscopic devices. Since in a conventional gyromagnetic compass system the flux valve-gyro error is applied to a torquer on the gyro to precess the same at a relatively slow rate, e.g., about 2° or 3° per minute, the gyro serves to integrate the flux valve information to thereby remove the undesired short term errors. However, short term maneuvers of the craft will be immediately detected by the gyro but will not be seen by the slaving loop. The long term gyro drift on the other hand will not be allowed to build up on a long term basis because the gyro is slaved to the flux valve.

Many variations of the basic gyromagnetic compass configuration just described have been proposed and successfully implemented. One of these is an arrangement wherein the gyro is not slaved to the magnetic meridian and the integration of the flux valve information is accomplished by an electromechanical integrator, the gyro information providing only the short term data stabilization, the latter being supplied through a fast response electromechanical follow-up loop. Such a system is described in the applicant's assignee's U.S. Pat. No. 2,699,612

The latter arrangement provides satisfactory results but in terms of present day reliability and maintainability leaves something to be desired because of its electromechanical nature involving motors, generators, gear trains, and the like subject to wear and relatively frequent periodic maintenance.

SUMMARY OF THE INVENTION

The gyromagnetic compass system of the present invention is in effect a combination of the two general types of systems described above and constitutes a significant improvement thereover in as much as it is applicable to all-solid-state electronics and involves no moving parts except for the raw data sources, i.e. the flux valve and the gyroscopic reference. While, in general, the directional gyro of the present invention is not mechanically slaved to the magnetic meridian, it is electronically "slaved" to the magnetic meridian through the incorporation of an electrical differential device coupled with the vertical gimbal of the directional gyro. The slaving signal, herein termed the synchronizing angle $\psi_s$, is applied to one element of the electrical differential device, the output of which constitutes the output of the system, hereinafter termed $\psi_o$, which output includes the desired short term and long term components of gyroscopic and magnetic heading, respectively. The synchronizing angle is developed by a comparison of the output of the flux valve, herein termed $\psi_m$, with the system output $\psi_t$ the difference therebetween being effectively integrated out as in U.S. Pat. No. 2,357,319, while the long term gyro drift errors are likewise removed by an equal and opposite electrical rotation of the gyro output as in U.S. Pat. No. 2,699,612.

One of the principal advantages of the electronic slaving concept of the present invention is that the electrical control is entirely solid-state involving no moving parts. Another important advantage of the invention is in its application in attitude and heading reference systems wherein a gyroscopic platform is employed to provide pitch, roll, and heading data for the aircraft. In most cases, the heading data is provided by a directional gyroscope, the vertical gimbal of which is maintained vertical by a vertical gyroscope, all in a common support gimbal structure. Since the directional gyroscope is electronically slaved rather than electromechanically slaved, the slaving torquer on the gyro is eliminated, thereby eliminating balance problems but more important eliminating any reaction torques on the vertical gyro thereby improving the accuracy of the latter.

In a preferred embodiment of the present invention the foregoing is accomplished by means of all-solid-state digital integration techniques, although it will be understood that in its broadest aspect the basic concept contemplates the use of analog techniques embodying electromechanical integration.

BRIEF DESCRIPTION OF THE FIGURES

Preferred embodiments of the gyromagnetic compass of the present invention are schematically illustrated in the attached drawings, wherein.

DETAILED DESCRIPTION OF PREFERRED EMBODIMENTS

Figure 1:
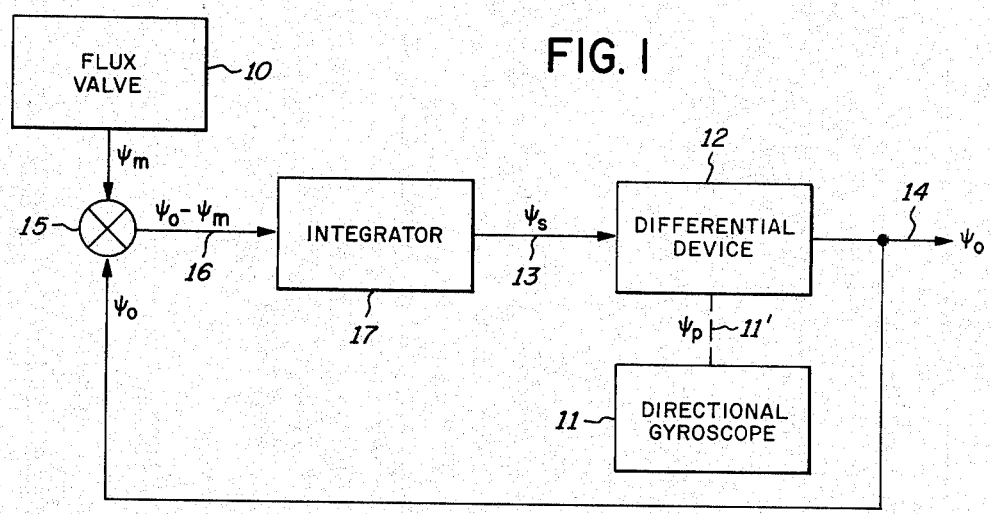
FIG. 1 is a simplified block diagram illustrating the basic concept of the present invention.

Referring now to FIG. 1, which illustrates in simplified form a gyromagnetic compass system embodying the teachings of the present invention, the sources of heading data comprise a flux valve 10 for supplying a signal corresponding to the angular orientation of the aircraft fore and aft axis relative to magnetic north, and a gyroscopic directional reference such as a directional gyroscope 11, for supplying a signal corresponding to the angular orientation of the aircraft fore and aft axis relative to the inertial reference defined by the gyroscope, for example, the directional gyro rotor spin axis. The flux valve 10 may be of the type shown in the above referenced application Ser. No. 796,349 or in applicant's assignee's U.S. Pat. No. 2,852,859 wherein the three legged flux sensor is maintained in the horizontal plane by means of a pendulous mass and suspension all contained in a housing which in turn is secured to the aircraft. The flux valve, while providing an excellent long term heading reference is subject to short term perturbations due to aircraft accelerations acting on the pendulous element thereof. The gyroscopic directional reference may be a conventional directional gyroscope of the type shown in the above U.S. Pat. No. 2,383,461 wherein the vertical gimbal (an extension thereof being indicated by dotted connection 11' and labelled $\psi_p$) is stabilized by the gyroscopic inertia of a spinning rotor, the spin axis thereof being maintained horizontal, or at right angles to the vertical gimbal, by conventional leveling means. Alternatively, the gyroscopic directional reference means may be a stable platform of the type shown in the above referenced copending application Ser. No. 10,537 or of the type shown in applicant's assignee's U. S. Pat. No. 3,266,325. The gyroscopic directional reference while providing an excellent short term heading reference is subject to long term perturbations due to imperfections in the gyroscope which cause it to drift away from its reference direction even though such drift characteristics may be very small, for example, on the order of a fraction of a degree per hour depending upon the quality of the gyro.

Mounted on directional gyro 11 (or the directional reference of a gyro platform) is a differential device 12. This device may comprise a rotatable electrical differential having a stator fixed in azimuth relative to the craft and a rotor positioned by the vertical gimbal ring of the directional gyro. Input information appearing on input connection 13 is applied to the stator windings of the differential device and output information appearing on connection 14 is taken from rotor windings thereof, the output information thereby constituting the algebraic sum of the input information and the position of the directional gyro.

In accordance with the teachings of the present invention, the gyro-magnetic compass system constitutes a closed loop or feedback system wherein the output of the flux valve 10, which is the signal $\psi_m$, is algebraically combined in a suitable summing device 15 with the output of the differential device 12 on lead 14, which is the output and feedback signal $\psi_o$, to produce a difference signal $\psi_m - \psi_o = \psi_e$ on lead 16. The difference signal $\psi_e$ on lead 16 is applied as an input to an integrator device 17 which serves to integrate the error signal to produce an output on lead 13 proportional to the integral of the error $\psi_e$. Thus, $\psi_m - \psi_o = \psi_e$ which is integrated to produce $\psi_a = \int \psi_e dt$. The time constant of the integrator is selected such as to produce a synchronization rate of a few degrees per minute, for example, on the order of 2° to 3° per minute. It will be appreciated, therefore, that while the directional gyro spin axis is not mechanically slaved to the magnetic meridian as in the one form of prior gyromagnetic compass system, nor is it "outside the loop" as in another form of gyromagnetic compass system, the gyro is maintained in the compass loop and is electronically slaved to the magnetic meridian at the differential device on the gyro.

Thus, by means of the apparatus of the present invention, undesirable short term perturbations inherent in the output of the flux valve 10 are compensated by the long term response characteristics of integrator 17 and do not reach the output 14 while at the same time the desirable short term responses of the gyro 11 appear directly in the output signal on output 14. On the other hand, the desirable long term components of magnetic heading appear at the output of the integrator 17, and hence at the output of the system on output 14 through differential device 12, while at the same time the undesirable long term components from gyro 11 due to gyro drift also appear at the output of integrator 17 and cause the output to be rotated in an equal and opposite direction. In effect, therefore, the gyro is allowed to wander but its reference is continually slaved to the magnetic heading of the craft on a long term basis while it continues to indicate the instantaneous heading of the craft.

Figure 2A:
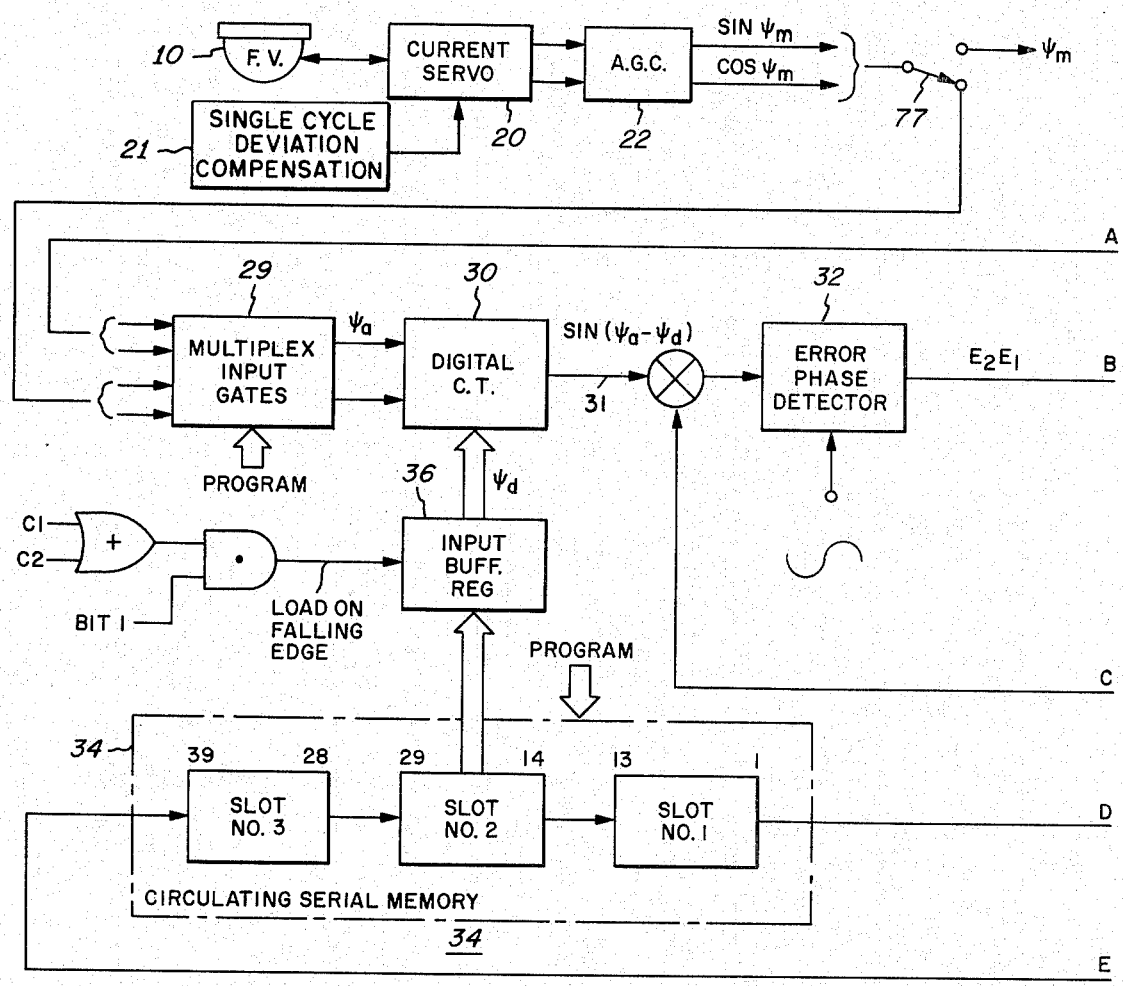
FIG. 2a and 2b constitute a schematic block diagram of a preferred embodiment of the present invention including all-solid-state digital electronics.
Figure 2B:
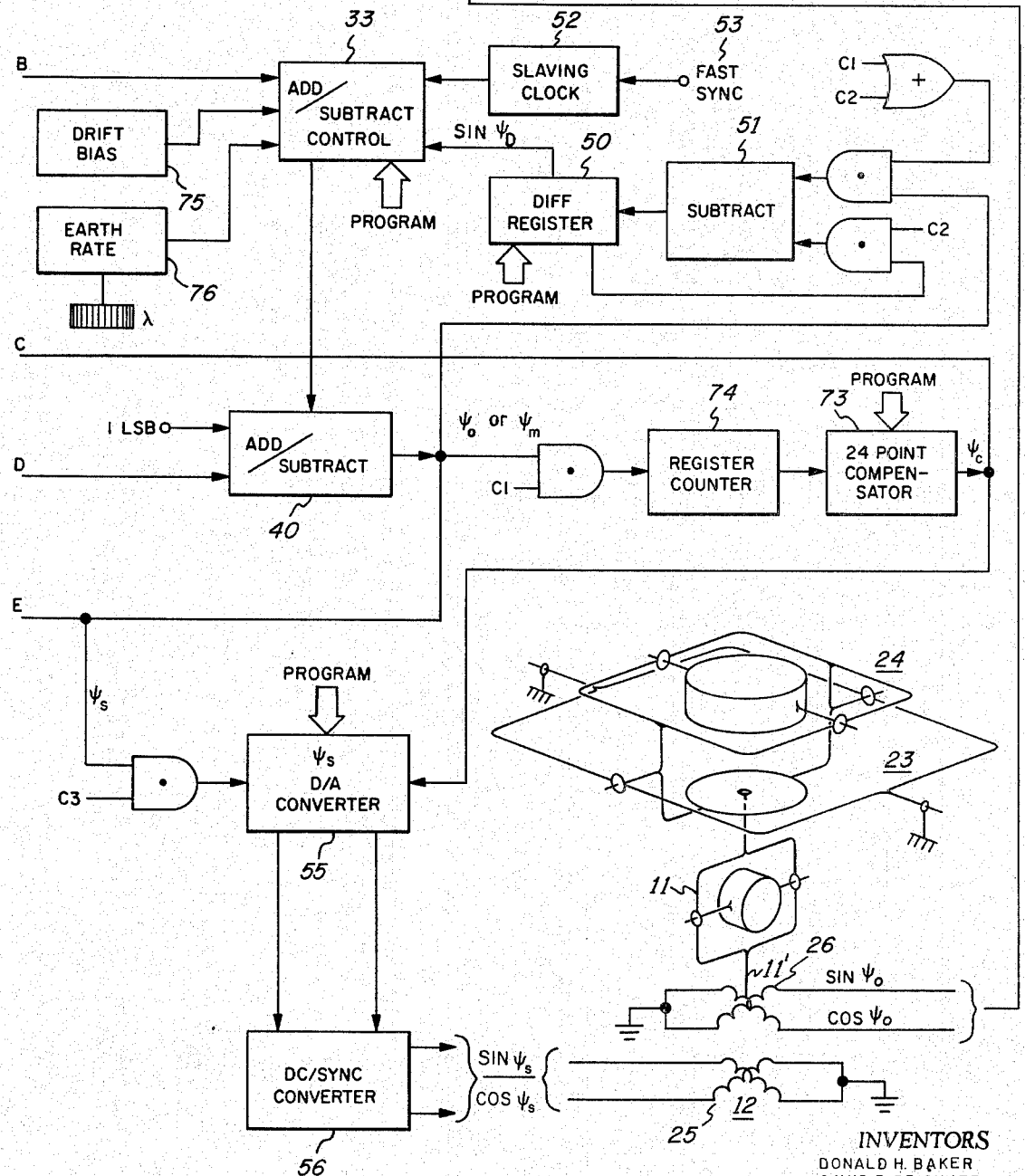

One preferred embodiment of the present invention is illustrated in schematic block diagram form in FIG. 2. In general the embodiment involves all-solid-state digital electronics wherein signals proportional to magnetic heading $\psi_m$ derived from the flux valve are converted to sine-cosine signals representative of the magnetic heading of the craft. This sine-cosine data is converted to corresponding digital values in an analog-todigital converter. The sine-cosine values of the system output $\psi_o$ from the gyro differential device are also digitized on a time-share basis in the same analog-to-digital converter. The digital magnetic heading signals, $\psi_m$, and the digital output heading signals, $\psi_o$, are separately supplied to a digital processor for continuous updating by their corresponding analog values. The digital heading signals are also supplied to a difference signal register. The difference therebetween, which signal is also included in the same processor and is updated at a slow rate, is effectively integrated to thereby generate the synchronizing signal $\psi_s$. This signal is then reconverted to analog sine-cosine signals and applied to the differential device on the gyro. In this embodiment, the differential device comprises a sine-cosine resolver mounted on the directional gyro's vertical gimbal. The sine-cosine values of the synchronizing angle $\psi_s$ are supplied to corresponding stator windings of the resolver, the rotor windings of which provide sine-cosine signals corresponding to the sum of $\psi_s$ and $\psi_p$, where $\psi_p$ is platform or gyro heading, which constitutes the output of the system.

The sine and cosine values of magnetic heading $\psi_m$ are derived in a manner set forth in the above-mentioned copending application Ser. No. 787,143. As disclosed therein, the three-wire output of flux valve 10 is applied to current servo 20 in which the three-wire data is converted to sine-cosine data through a Scott T from which dc currents proportional to sine-cosine values of magnetic heading $\psi_m$ are derived. These signals are suitably scaled and converted to three wire data and fed back to the flux valve to buck out the magnetic field components sensed by the flux valve, the magnitude of dc currents therefore being proportional to direction of the magnetic field.

Single cycle deviation compensation signals may be provided by compensator 21 which may modify the dc sine-cosine voltages in sense and magnitude in accordance with single cycle error as taught generally in the above mentioned U.S. Pat. No. 2,852,859.

In order to compensate the magnetic heading signal for errors due to field strength variations, the dc voltages proportional to sin $\psi_m$ and cos $\psi_m$ are passed through a suitable automatic gain control circuit 22.

The gyroscopic heading reference illustrated in the preferred embodiment of FIG. 2 is illustrated as a gyroscopic platform 23 wherein the directional gyro 11 thereof is stabilized to the vertical by means of a vertical gyro 24. The detailed structural arrangement and operation of the platform 23 is disclosed in the above mentioned copending application Ser. No. 10,537. Mounted on directional gyro 11 is an electrical component resolver 12, the stator 25 of which is supported by the directional gyro support frame and the rotor 26 of which is positioned by the vertical gimbal trunnion 11'. The system output signals sin $\psi_O$ and cos $\psi_O$ are taken from the resolver rotor windings 26 for outputting and for feeding back for comparison with the magnetic data, as in FIG. 1.

Sin $\psi_{m_a}$ and cos $\psi_{m_a}$ (sub a denoting analog format) signals in ac analog format from AGC 22 and sin $\psi_{o_a}$ and cos $\psi_{o_a}$ from output windings 26 of resolver 12 are applied in multiplex-fashion to the input of an analog-to-digital circuit, herein referred to as a digital control transformer 30. This device is of the type shown in the above mentioned U.S. Pat. No. 3,576,986 and is similar in operation to a synchro control transformer where the three-wire data is in resolver sin/cos format and the shaft angle is represented by a digital word. The output on lead 31 is a signal representative of the sine of the difference angle $\psi_{m_d} - \psi_{m_a}$ or $\psi_{o_d} - \psi_{o_a}$ (sub d denoting digital format). The polarity of this output is dependent only upon whether $\psi_{m_d}$ (or $\psi_{o_d}$) is greater or less than $\psi_{m_a}$ (or $\psi_{o_a}$) and this is detected by error phase detector 32. The output of detector 32 is used to update the digital word continuously in a circulating memory 34 to maintain the difference at a null. For this purpose the output of phase detector 32 is applied to add/subtract control 33 which is controlled by a program to increase or decrease the appropriate word in the memory one bit at a time by means of add/subtract circuit 40 as will be described below.

As pointed out above, the digital CT 30 is time-shared between magnetic heading $\psi_m$ and system output data $\psi_O$, the time sharing being controlled in a conventional manner by suitably programmed gates 29 coupling the $\psi_m$ and $\psi_O$ data to the digital CT. These switches may be operated conventionally by a suitable clock controlled program. In practice, the digital CT 30 and circulating memory 34 may also be employed to digitize other control data of the complete attitude and heading reference system, such as the synchronizing angle $\psi_s$ as well as certain control data from the vertical gyro 24, for purposes not part of the present invention, e.g., and for providing analog to digital conversion of roll and pitch data, erection control, quick erection, outer roll gimbal servo control, etc.

Figure 4:
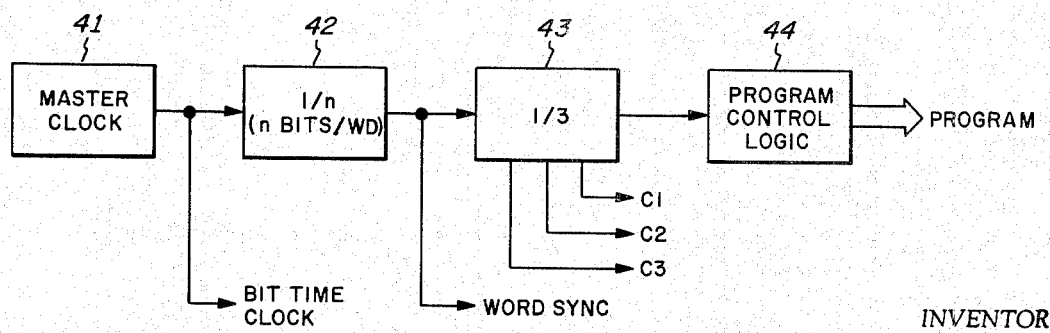
FIG. 4 is a block diagram of the timing clock of the apparatus of FIG. 2.
Figure 3:
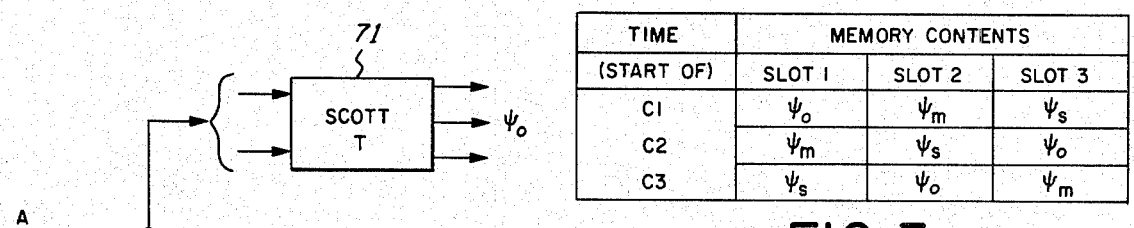
FIG. 3 is a table representing the contents of the memory included in the apparatus of FIG. 2.

The output of the digital CT 30 comprises signals proportional to sin $(\psi_{m_a} - \psi_{m_d})$ or sin $(\psi_{o_a} - \psi_{o_d})$ as defined by the program step. As shown in U. S. Pat. No. 3,576,986; the digital control transformer output, which is a 400 Hz ac signal at lead 31, is phase detected at 32 and applied to a serial digital data processor comprising add/subtract controller 33, add/subtract circuit 40 and circulating memory 34. The circulating memory 34 comprises three 13-bit words corresponding to $\psi_m$, $\psi_O$ and $\psi_s$, which words are serially and continuously circulated through the memory synchronously with a suitable programmer 44. FIG. 4 illustrates a suitable timing arrangement for the program and includes a master clock 41 operating, for example, at one megahertz. This clock frequency is divided by the memory word length by divider 42 into three 13 bit words which may be identified in time by pulse chains C1, C2 and C3. Divider 43 provides the program control cycle time. Each word is circulated serially through the memory at the megahertz bit rate from clock 41 as illustrated by the table of FIG. 3. The programmer 44 may, if desired, control the multiplexing of the $\psi m_a$ and $\psi_{o_a}$ data into the digital CT 30 as schematically illustrated.

In accordance with the teachings of the present invention, the synchronizing angle $\psi_s$ is the "slaved" heading angle and constitutes the long term zero reference for the gyro. It is defined as the integral of the difference between $\psi_O$ and $\psi_m$. In the digital apparatus illustrated in FIG. 2, this difference angle $\psi_D$ is derived in $\psi_D$ register 50. This register may be set to zero by programmer 44 upon initialization of the system and at each memory cycle time. When $\psi_O$ appears in the circulating memory 34, as will be explained below, it is supplied to $\psi_D$ register 50 through subtract unit 51 so that the contents of register 50 represents $\psi_0$. When $\psi_m$ appears in the memory 34 it is also gated to subtract unit 51 where it is subtracted from the contents of the $\psi_D$ register, the difference therebetween now being the contents of the $\psi_D$ register. Therefore, the resultant content of the $\psi_D$ register is equal to $\psi_0 - \psi_m$. The polarity or sign of this quantity is fed back to the add/subtract control 33 for determining the sense in which the "slaving" must occur, that is it determines whether the value of $\psi_s$ in the memory 34 must be incremented or decremented. The integral effect is provided by a slow operating clock, referred to herein as the slaving clock 52. This clock operates at one least significant bit per second which in terms of the bit word length used in the present embodiment corresponds to a slaving rate of about 2.6 arc minutes per second or about 2½° per minute. In twos complement notation the zero condition is recognized as a positive number, that is, sign bit is equal to a logical zero. Therefore, when a null is reached, $\psi_s$ will be alternately incremented and then decremented.

For a better understanding of the operation of the digital processor in the updating of $\psi_0$, $\psi_m$ and $\psi_s$ in memory 34, a typical program flow or cycle will be described. The table of FIG. 3 shows the contents of circulating memory 34 and the beginning of each of the times C1, C2 and C3. At the fall of the first bit of C1, $\psi_m$ is in slot 2 and is gated into buffer register 36 and $\psi_m$ analog is gated from input gates 29 into CT 30. From the previous cycle, the phase difference E2 between $\psi_{o_d}$ and $\psi_{o_a}$ from phase detector 32 was gated into add/subtract control 33 and this control is now used to command add/subtract circuit 40 to update $\psi_0$, which is now in slot 1, by 1 least significant bit in accordance with E2. At the $n^{th}$ bit of C1, the words in the memory have been shifted almost one word length and the difference E1 between $\psi_{m_d}$ and $\psi_{ma}$ from phase detector 32 is now gated into add/subtract controller 33 for use in the C2 portion of the cycle time.

At the fall of the first bit of C2 nothing is gated into the buffer 36 because $\psi_s$ is in slot 2 and during normal operation $\psi_s$ is not applied to the CT 30 and nothing is gated from analog input gates 29. During C2, the error E1 ($\psi_m$ error) from add/subtract control 33 is gated to command add/subtract unit 40 to update $\psi_m$ which is now in slot 1. At the $n^{th}$ bit of C2 the words in the memory have again been shifted almost 1 word length and the sign of the output of the difference register 50 is gated into add/subtract controller 33 for use in the C3 portion of the cycle time. Thus, at the fall of the first bit of C3, $\psi_0$, which is now in slot 2, is gated into buffer 36 and $\psi_0$ analog is gated into CT 30 from input gates 29. During C3, the error or sign of $\psi_D$ from add/subtract controller 33 is used to command add/subtract circuit 40 to update $\psi_s$ which is now in slot 1. However, it will be noted that this latter gating takes place only if the slaving clock is ripe, i.e., it updates at the slaving rate of 1 LSB per second, as above described, rather than at the high speed memory cycle time. At the $n^{th}$ bit of C3 the words in the memory have once again been shifted almost 1 word length and the phase difference E2 from detector 32 is gated into add/subtract controller 33 for use in the C1 cycle time again.

It will be understood that the above described program is illustrative only and that many different routines may be devised for accomplishing the desired circulating function. Also, while a circulating serial memory has been described herein as a preferred embodiment (because very high speed computation is not a requirement in the present system), it will be understood that a parallel memory may be employed without departing from the true spirit of the invention.

Thus, it will now be appreciated that the $\psi_0$, $\psi_m$ and $\psi_s$ data are continuously and serially circulated through memory 34 and are continuously updated to reflect current values. It will also be noted that the flow of information into the subtract circuit 51 and difference register 50 are controlled by C1 and C2 simultaneously with the above program sequence as indicated by its control logic. However, it should be noted that when the system is first turned on, there may be a very large angle between $\psi_m$ and $\psi_0$ and therefore this angle must be quickly inserted into the $\psi_s$ memory. This is accomplished by increasing the slaving clock 52 rate as schematically indicated at 53. As stated above, the normal incrementing and decrementing of $\psi_s$ in memory 34 is 1 LSB per second; for fast synchronizing this rate may be increased to a bit rate corresponding, for example, to 30° per second. $\psi_s$ may also initially be set into memory 34 by the pilot by switch means on the pilot's controller. Different synchronization rates may easily be provided. If $\psi_s$ is very large, the 30° per second bit rate may be selected; if it is small, a lower bit rate may be selected. For example, corresponding to 2° per second. It will be understood that in initializing the heading system of the present invention it is also possible to transfer $\psi_D$ (contents of Diff Register 50) directly to the $\psi_s$ data position in memory 34.

Figure 5:
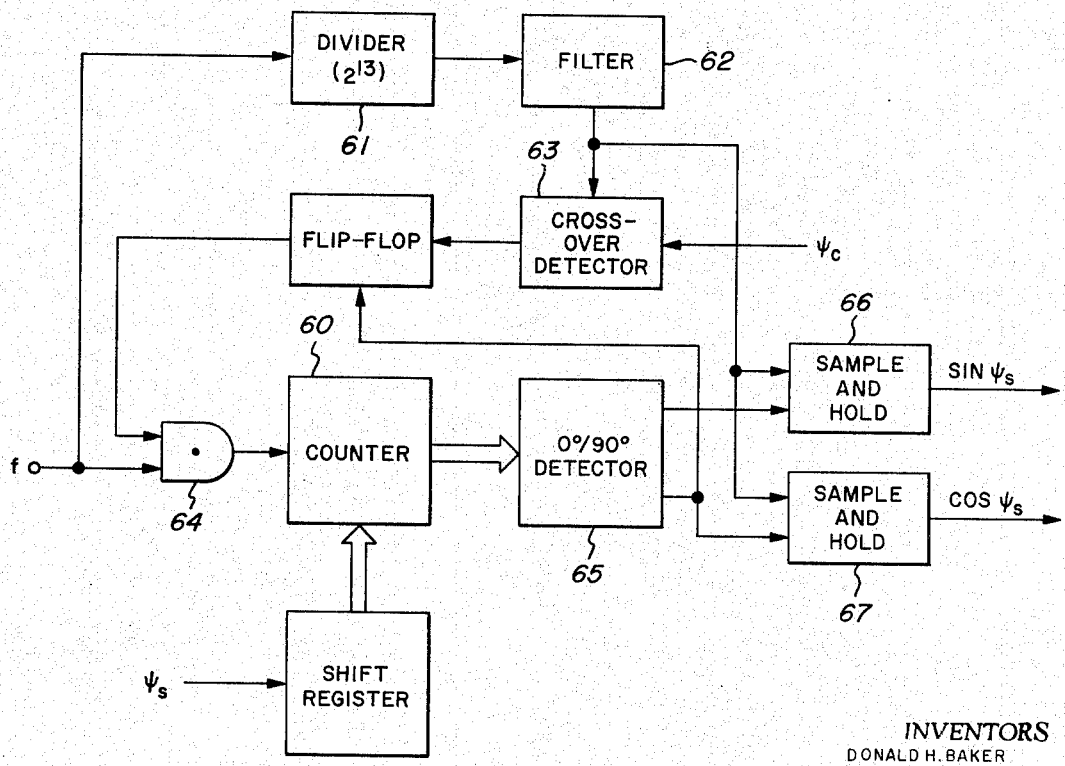
FIG. 5 is a block diagram of a suitable D/A converter embodied in apparatus of FIG. 2.

The digital synchronizing angle $\psi_s$ circulating in the memory 34 must be converted into analog sin/cos ac format so that it can be utilized in the resolver 12 at directional gyro 11. For this purpose a $\psi_s$ digital-to-analog converter 55 and dc to synchro converter 56 are provided. A more detailed block diagram of D/A converter 55 is illustrated in FIG. 5. Basically, the digital number in two's complement notation representing the $\psi_s$ angle is gated out of the circulating memory 34 upon initialization of C3. This number is reduced to zero in a counter by a clock which is a synchronous harmonic of a sine wave. The sine wave is sampled as the counter goes through zero equivalent to determine sine of the digital angle $\psi_s$ and, at the −90° equivalent, to determine the cosine of the digital angle $\psi_s$.

Referring to FIG. 5, the two's complement angle $\psi_s$ is loaded into a conventional counter 60. The synchronous harmonic clock for the counter 60 is the 1 megahertz reference from clock 41, FIG. 4. The clock output is divided by $2^{13}$ (in this embodiment) in divider network 61 and suitably filtered in filter 62 to provide a clean sine wave output which in turn is applied to crossover network 63. When the sine wave passes through zero the counter 60 is gated, through gate 64, to begin a countdown of the digital value of $\psi_s$ in counter 60. When a zero count is reached, as detected by the 0° detector logic gate 65, the instantaneous value of the reference sine wave from filter 62 is proportional to sin $\psi_s$ and this signal is shifted into the sine sample and hold network 66 where the reference sine wave from filter 62 is sampled to provide a dc signal output proportional to sin $\psi_s$. Counting by the counter 60 continues until a count corresponding to 90° is reached, as detected by the 90° detector logic gate 65. At the end of this countdown the instantaneous value of the reference sine wave from filter 62 is proportional to cos $\psi_s$ and this signal is shifted into the cosine sample and hold network 67 where the reference sine wave from filter 62 is sampled to provide a dc signal output proportional to cos $\psi_s$. The sin $\psi_s$ and cos $\psi_s$ dc signals are modulated by a 400 Hz carrier using conventional modulator techniques herein referred to as a dc to synchro converter 56.

In accordance with the teachings of the present invention, the sin $\psi_s$ and cos $\psi_s$ signals represent the long term components of the magnetic heading of the craft together with any heading components due to long term gyro drift. These signals are applied respectively to the sine/cosine windings of resolver stator 25 of the directional gyro resolver 12. The sine/cosine windings 26 of resolver 12 being mounted on and positioned by the vertical gimbal trunnion 11' of gyro 11, will have the long term components of craft heading induced therein and the voltage outputs thereof will reflect not only these components but also any short term components due to rapid changes in craft heading detected by the gyro. Thus, the outputs of the resolver rotor windings will be sin ($\psi_s + \psi_p$) and cos ($\psi_s + \psi_p$) where $\psi_p$ is the gyro heading, these outputs constituting the compass system outputs, sin $\psi_O$ and cos $\psi_O$. In accordance with the teachings of the present invention, the sine/cosine components of craft heading are fed back via lead 70 for inputing to the digital CT 30 for comparison with $\psi_m$ as described above.

The magnetic heading of the aircraft is a primary reference and is required in many aircraft avionic systems such as display systems, autopilot systems, flight director systems, area navigation systems and the like. In many cases this data is required in three-wire synchro format for proper interfacing with these systems. For this purpose the sin/cosine components of $\psi_O$ heading may be supplied to a conventional Scott T network 71 for conversion to three-wire format. It will be understood, however, that if this $\psi_O$ data is required in digital format, it may be supplied directly from memory 34 to suitable sample and hold networks through a suitable program routine.

The compass system of the present invention is operable in a number of modes; for example, "Compass" mode, "D.G." mode and "Slaved" mode by means of a pilot controller selector, not shown. The slaved mode is, of course, that just described. If it is desired to operate in the compass mode, i.e. magnetic heading only, it is only necessary to switch the output of AGC network 22 to bypass the slaving and gyro loop as schematically illustrated by switch 77. If it is desired to supply compass information $\psi_m$ in digital format it is only necessary to separately gate out $\psi_m$ from the circulating memory 34 which is easily accomplished by a program routine. In a similar fashion, if it is desired to operate in the D.G. mode, it is only necessary to stop the slaving clock in which case only the compensated gyro data will appear at the output of Scott T 71.

There are certain compensations required in gyromagnetic compass systems for accurate performance, the most important of which are the compensation of static compass errors (or two-cycle errors), calibrated gyro drift rate error and earth's rate error. These compensations may be provided in the present digital system as described below.

In past systems two cycle errors have been compensated by both mechanical and electrical means, one type of the former comprising a multi-point adjustable cam, the follower of which is mechanically positioned by DG or magnetic heading data and serving to correct the output heading in accordance with the adjustment of the cam surface, while one type of the latter is a variably coupled rotary transformer-like device in the magnetic heading data synchro chain as shown in applicant's assignee's U.S. Pat. No. 2,810,102. In the present digital system, the generation of this compensation signal $\psi_c$ is accomplished at 24 point compensator 73 the details of which are shown in and described in the above mentioned application Ser. No. 880,037. As disclosed in that application, the magnitude and sense of the compensation for 360° of heading is determined during system calibration using a curve fitting process and these values are set on 24 resistors. When $\psi_O$ is programmed out of circulating memory 34, as by the fall of C1, it is also supplied to a register counter 74 for determining the proper selection of the preset resistance values corresponding to craft heading. The register 74 may constitute the same type of countdown circuitry employed in the $\psi_s$ D/A converter and for that matter this latter converter may actually be used as a time share basis with the $\psi_s$ data.

The compensation signal $\psi_c$ is combined with the $\psi_m$ signal output of the digital CT 30 and is selected by the program when the updating of $\psi_m$ in memory 34 is to be made as by changing the value of E2. However, in order that the compensation signal not be integrated out by operation of the slaving control, it is also necessary to insert this correction in the $\psi_s$ data. This insertion is accomplished by supplying the $\psi_c$ signal to the $\psi_s$ D/A converter 55 and specifically to the cross-over detector 63 (FIG. 5) where it serves to shift the sine and cosine sampling points by an angle corresponding to $\psi_c$.

Normally, a directional gryo's drift rate will consist of two components; predictive and hence controllable drift characteristics and unpredictive and hence uncontrollable drift characteristics. The former may be determined by calibration, the latter may not. Thus, calibrated gyro drift rate is inserted into the system of the present invention to improve system accuracy. Since the compensation is a rate, an oscillator having an adjustable frequency may be employed to insert the desired rate. For this purpose an oscillator 75 is provided, the frequency of oscillation of which is adjusted in accordance with the calibrated rate and its output is used to generate a discrete of corresponding frequency which is gated into add/subtract controller 33 in timed relation with E2, the $\psi_O$ update error.

Since earth's rate which also effects gyro output data is a predictive rate, it can be compensated by the same technique as calibrated gyro drift error. Thus, an oscillator 76 whose frequency is adjusted, as by the pilot setting a suitably calibrated knob, in accordance with the sine of the latitude, a corresponding discrete frequency is similarly gated into add/subtract controller 33 for adjusting the updating of $\psi_o$ in memory 34.

Figure 6:
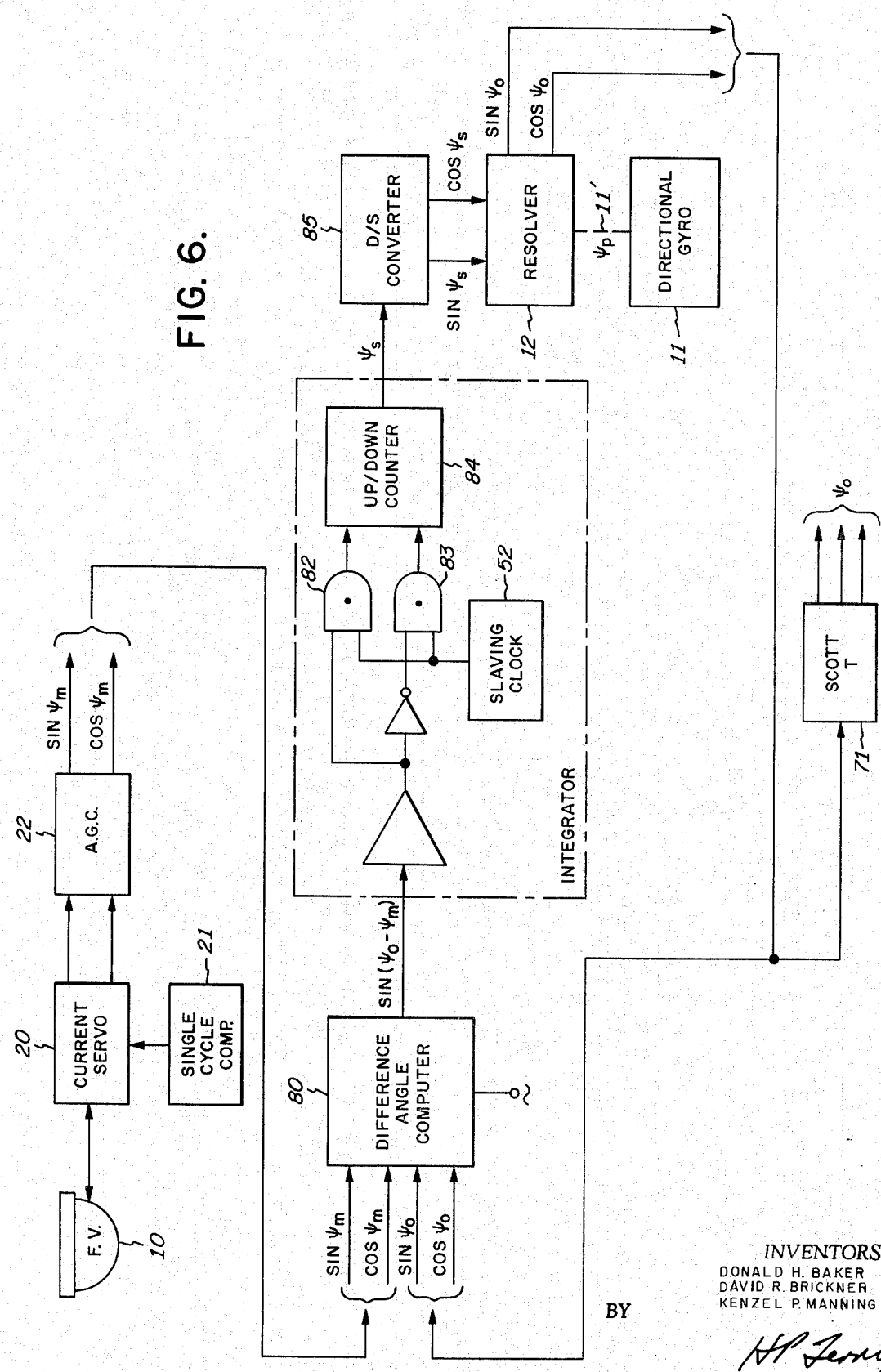
FIG. 6 is a block diagram of a simplified embodiment of the present invention.

The apparatus of FIG. 2 constitutes a complete high performance compass system and is ideally applicable in those systems where a number of variables are to be converted from analog to digital format; for example in an attitude and heading reference system. In FIG. 6 there is illustrated a considerably simpler embodiment of the present invention in which the multiplexing of a plurality of data is eliminated and replaced with a relatively simple circuit arrangement. The basic philosophy of course remains the same.

Referring now to FIG. 6, sine and cosine values of $\psi_m$ may be derived from flux valve 10 in exactly the same manner as in the embodiment of FIG. 2 and the same type of resolver 12 may be employed on the directional gyro 11, which, in this embodiment may be a single gyroscopic instrument and not necessarily associated with a platform. The sine and cosine of the $\psi_o$ output of the resolver rotor is similarly fed back for comparison with the sine and cosine $\psi_m$ signals from the flux valve 10. The difference of these two signals may be derived in a wholly solid state fashion by means of a difference angle computer 80. A suitable form of this difference angle computer may be that shown in the above mentioned application Ser. No. 31,544 which supplies an analog signal output proportional to the sine of the difference between $\psi_o$ and $\psi_m$, viz. sin ($\psi_o - \psi_m$). This output signal may then be digitized and integrated to produce the synchronizing angle $\psi_s$. One all-solid-state technique for accomplishing this is by means of digitizer and integrator 81.

The error signal sin ($\psi_O - \psi_m$) is suitably amplified and applied to a gating circuit consisting of gates 82 and 83 each operated by the slaving clock 52 which, as in the apparatus of FIG. 2, operates at a bit rate such as to provide a slaving rate of 2-½° or so per minute. As schematically shown, the slaving clock 52 will increment or decrement the $\psi_O - \psi_m$ error depending on its sense, into a conventional up/down counter 84. The output of counter 84 is therefore the integral of the $\psi_O - \psi_m$ error and hence constitutes the synchronizing angle $\psi_s$ in digital format.

As in FIG. 2, this digital word corresponding to $\psi_s$ must be converted to analog format for application to sine/cosine resolver 12. This may be accomplished with the use of a conventional digital to analog sine/cosine converter 85. If desired, the converters 55 and 56 of FIG. 2 may be employed. As in the FIG. 2 system, the resolver 12 stator windings are excited with sin $\psi_s$ and cos $\psi_s$ respectively and the system outputs are taken from the sin $\psi_O$ and cos $\psi_O$ windings of the resolver rotor, these outputs being fed back for comparison with the $\psi_m$ data and to Scott T 71 for outputing.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a gyromagnetic compass system for aircraft including a magnetic compass for providing a first signal having both desired long term and undesired short term components of the magnetic heading of the aircraft, a directional gyroscope for providing a second signal having both desired short term and undesired long term components of the inertial heading of the aircraft, differential means having a part fixed relative to said gyroscope and a part positioned by said gyroscope whereby the output of said differential means includes said desired long term component of said magnetic heading signal and said desired short term component of said inertial heading signal and a system output means connected to receive the output of said differential means, the combination comprising,
   a. wholly electronic computer means including means responsive to said first and second signals for providing a signal continuously representative of the difference therebetween,
   b. a source of periodically varying timing signals the period of said signals being much longer than the period of said short term components of said first and second signals,
   c. means responsive to said timing signals for sampling said difference signal at the period of said timing signals and providing an output which varies at a rate corresponding to the period of said timing signals, and
   d. means for supplying the output of said sampling means to the fixed part of said differential means whereby to cancel the long term components of said second signal and render said system output means responsive only to the long term components of said first signal and the short term components of said second signal.

2. The compass system as set forth in claim 1 wherein said electronic computer means further comprises,
   a. memory means,
   b. means for storing said first and second signals in said memory means,
   c. a second source of periodically varying timing signals having a period much shorter than the period of the short term components of said first and second signals,
   d. first means responsive to said second timing signals for continuously updating the values of said first and second signals in said memory means to their instantaneous values, and
   e. second means responsive to said second timing signals for comparing said memorized first and second signals and for providing said continuous difference signal.

3. The compass system as set forth in claim 2 wherein said second means includes,
   a. means for storing said difference signal in said memory means,
   b. means responsive to said first mentioned source of timing signals for updating the value of said difference signal, and
   c. means for supplying said updated difference signal to said differential means.

4. The compass system as set forth in claim 3 wherein said second source of timing signals has a period on the order of thousands of cycles per second and said first source of timing signals has a period on the order of 1 cycle per second.

5. The compass system as set forth in claim 3 further including means for rapidly synchronizing said magnetic compass and said gyroscope comprising,
   a. means for rendering said sampling means unresponsive to said first timing signals and rendering the same responsive to said second timing signals whereby to substantially instantaneously synchronize said magnetic compass and said gyroscopic means.

6. The compass system as set forth in claim 3 further including means for compensating said gyroscope means for the effects of earth's rotation comprising,
   a. means for providing a signal corresponding to the latitude of operation of said aircraft, and
   b. means responsive to said latitude signal for effectively altering the period of said first timing signal.

7. The compass system as set forth in claim 3 wherein said electronic computer means comprises a digital computer and wherein
   a. said first and second signals are analog signals and are converted to corresponding digital signals, wherein
   b. said memory means comprises a digital memory for storing said digitized signals, wherein
   c. said difference signal is the digital difference between said stored digitized first and second signals, wherein
   d. said second source of timing signal comprises a master clock operating at a frequency on the order of 1 megahertz and said first source of timing signals includes frequency dividing means responsive to said master clock for providing an output frequency on the order of 1 hertz, and wherein
   e. said updated digital difference signal is converted to an analog signal prior to being supplied to said differential means.

8. The compass system as set forth in claim 1 wherein said differential means comprises a differential sine/cosine resolver and wherein said first and second signals are each analog sine/cosine values of said magnetic heading and inertial heading angles and wherein said electronic computer means comprises,
   a. difference angle computer means responsive to the sine/cosine values of said first and second signals for providing an analog output which varies as the sine function of the difference between said magnetic and inertial heading angles, and wherein
   b. said sampling means comprises digital logic means responsive to the output of said difference angle computer and said first mentioned timing signals,
   c. counter means responsive to the output of said logic means for providing a digital signal varying at the rate of said first mentioned timing signals,
   d. digital to analog converter means responsive to the output of said counter means for supplying corresponding analog sine and cosine signals, and
   e. means for supplying sine and cosine signals to the corresponding windings of said sine/cosine differential resolver means.

* * * * *